United States Patent
Kim et al.

(10) Patent No.: US 12,272,470 B2
(45) Date of Patent: Apr. 8, 2025

(54) ALNICO-BASED HARD MAGNETIC PARTICLE AND METHOD FOR MANUFACTURING THE SAME

(71) Applicant: KOREA MINTING, SECURITY PRINTING & IDCARD OPERATING CORP., Daejeon (KR)

(72) Inventors: Soo Dong Kim, Daejeon (KR); Won Kyun Choe, Daejeon (KR); Sung Hyun Joo, Sejong (KR); Hong Keon Kim, Daejeon (KR); Hyun Soo Kim, Daejeon (KR)

(73) Assignee: KOREA MINTING, SECURITY PRINTING & IDCARD OPERATING CORP., Daejeon (KR)

( * ) Notice: Subject to any disclaimer, the term of this patent is extended or adjusted under 35 U.S.C. 154(b) by 125 days.

(21) Appl. No.: 17/413,553

(22) PCT Filed: Aug. 5, 2019

(86) PCT No.: PCT/KR2019/009706
§ 371 (c)(1),
(2) Date: Jun. 13, 2021

(87) PCT Pub. No.: WO2021/020634
PCT Pub. Date: Feb. 4, 2021

(65) Prior Publication Data
US 2022/0172867 A1   Jun. 2, 2022

(30) Foreign Application Priority Data
Jul. 29, 2019  (KR) ........................ 10-2019-0091610

(51) Int. Cl.
*H01F 1/047* (2006.01)
*B41M 3/14* (2006.01)
(Continued)

(52) U.S. Cl.
CPC ............... *H01F 1/047* (2013.01); *B41M 3/14* (2013.01); *C09D 11/03* (2013.01); *C22C 30/02* (2013.01);
(Continued)

(58) Field of Classification Search
CPC ............ H01F 1/047; H01F 1/06; B41M 3/14; C09D 11/03; C22C 30/02; C22C 30/00;
(Continued)

(56) References Cited

U.S. PATENT DOCUMENTS

| 2,724,174 | A | * | 11/1955 | Mendelsohn ............. H01F 1/06 428/570 |
| 2005/0051753 | A1 | * | 3/2005 | Hayashi ................. C01G 49/08 252/62.56 |
| 2017/0121783 | A1 | | 5/2017 | Palasyuk et al. |
| 2017/0283893 | A1 | | 10/2017 | Anderson et al. |

(Continued)

FOREIGN PATENT DOCUMENTS

| CN | 109550973 | 4/2019 |
| DE | 19627780 | 7/1996 |

(Continued)

OTHER PUBLICATIONS

PCT International Search Report.
Search Report from the European Patent Office dated Jul. 22, 2022.
Office Action from the Japan Patent Office dated Jun. 7, 2022.

*Primary Examiner* — Justin V Lewis

(57) ABSTRACT

Disclosed is an AlNiCo-based hard magnetic particle containing Al, Ni, Co, Cu, Ti, and the balance of Fe. The AlNiCo-based hard magnetic particle contains Co in an amount of 10 to 17 wt %, has a coercive force of 250-450 Oe, and has a residual magnetization/coercive force rate of 0.06 or more. The AlNiCo-based hard magnetic particle according to the present invention can advantageously guarantee magnetic properties suitable for being detected by a magnetic reluctance device due to a low content of Co.

7 Claims, 2 Drawing Sheets

(51) Int. Cl.
*C09D 11/03* (2014.01)
*C22C 30/02* (2006.01)
*C23C 18/16* (2006.01)
*C23C 18/44* (2006.01)
*H01F 1/06* (2006.01)

(52) U.S. Cl.
CPC ...... *C23C 18/1637* (2013.01); *C23C 18/1651* (2013.01); *C23C 18/44* (2013.01); *H01F 1/06* (2013.01)

(58) Field of Classification Search
CPC ................ C22C 33/0285; C22C 33/02; C23C 18/1637; C23C 18/16; C23C 18/1651; C23C 18/44; B22F 1/05
USPC .......................... 283/67, 72, 82, 94, 95, 98
See application file for complete search history.

(56) References Cited

U.S. PATENT DOCUMENTS

2020/0357544 A1* 11/2020 Kim .................. C09D 7/62
2020/0391285 A1 12/2020 Choe et al.

FOREIGN PATENT DOCUMENTS

| | | |
|---|---|---|
| JP | 61-15986 | 1/1986 |
| JP | 11-13765 | 6/1997 |
| KR | 10-1718505 | 3/2017 |
| KR | 10-2017-0078023 | 7/2017 |
| KR | 10-1869484 | 6/2018 |
| KR | 10-1912099 | 10/2018 |
| KR | 10-1912100 | 10/2018 |
| WO | 2019-098599 | 5/2019 |
| WO | 2019-132232 | 7/2019 |
| WO | WO-2019132232 A1 * | 7/2019 ............ B22F 1/0014 |

* cited by examiner

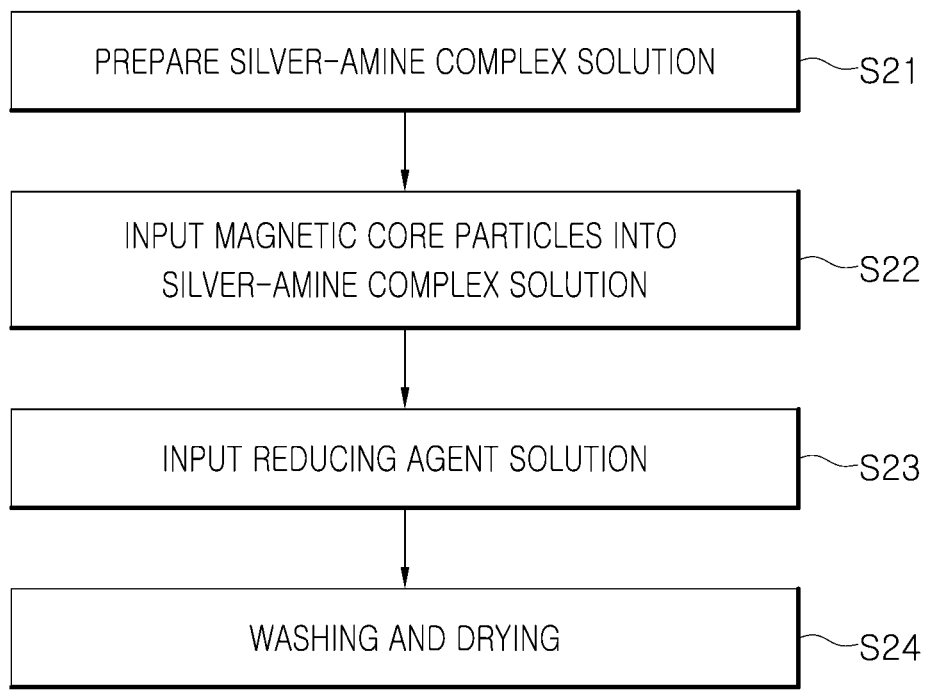
[Fig. 2]

ALNICO-BASED HARD MAGNETIC PARTICLE AND METHOD FOR MANUFACTURING THE SAME

The present application is a U.S. national phase application of PCT International Application PCT/KR2019/009706, which claims priority to Korean Patent Application No. 10-2019-0091610, filed Jul. 29, 2019, the entire contents of which are herein incorporated by reference.

TECHNICAL FIELD

The present disclosure relates to an AlNiCo-based hard magnetic particle and a method for manufacturing the same.

BACKGROUND ART

There has been increasing use of a magnetic material as a security factor to prevent the counterfeit or falsification of secure documents, such as bank bills, while providing product authentication thereof. When a secure document is printed with a pattern of security ink manufactured by mixing a magnetic material with ink, it is possible to determine whether or not the secure document is counterfeited or falsified using a detection device able to detect magnetic materials.

As detection devices able to detect magnetic materials contained in security ink, magnetoresistive devices using an electric resistance property that may be varied by an external magnetic field have been widely distributed. In order to detect a magnetic material using a magnetoresistive device, a permanent magnet for magnetizing the magnetic material is required. Among magnetoresistive devices distributed to date, both a magnetoresistive device type including a built-in permanent magnet and a magnetoresistive device type without a built-in permanent magnet are present. In the case of a magnetoresistive device without a built-in permanent magnet, a separate permanent magnet may magnetize a magnetic material and then the magnetoresistive device may detect a magnetic field generated by the magnetic material.

In addition, the property of a magnetic material contained in security ink must be carefully adjusted so that the authenticity of a secure document printed with a pattern of security ink may be determined using a magnetoresistive device. For example, the coercive force of the magnetic material may be adjusted to be in a predetermined range. When the coercive force of the magnetic material is equal to or higher than a specific value, it may be difficult to magnetize the magnetic material. This means that the performance of a permanent magnet for magnetizing the magnetic material must be improved. In some cases, it may be impossible to magnetize the magnetic material using an existing magnetoresistive device, and thus, it may be difficult to determine the authenticity of the secure document. When the coercive force of the magnetic material is excessively small, it may be difficult to obtain a detectable level of residual magnetization. Furthermore, since the magnetic material having the coercive force lower than the specific value has properties of a soft magnetic material, it may be difficult to detect the magnetic material without a magnetoresistive device including a built-in permanent magnet.

Even in the case that the coercive force is in a suitable range, when the residual magnetization is small, it is impossible to detect the magnetic material at high sensitivity using a typical magnetoresistive device, which is problematic. While the coercive force may be increased in order to increase the residual magnetization, there it is a risk that the coercive force may exceed the suitable range. Thus, it is required to increase the residual magnetization while maintaining the coercive force in the suitable range. In this aspect, a residual magnetization/coercive force ratio may be an important numerical value for magnetic particles used in security ink.

Study on AlNiCo-based magnetic materials as magnetic materials to be used in security ink is underway. Korean Patent No. 1869484 discloses a technology of manufacturing hard magnetic powder by heat-treating magnetic particles produced from an AlNiCo-based molten metal by vacuum atomization. In addition, the Co content of the AlNiCo-based magnetic material is generally increased to improve the coercive force and the residual magnetization. However, this may not be appropriate in terms of economic competitiveness, since Co is relatively expensive. Thus, there is demand for the development of an AlNiCo-based magnetic material having a novel composition, by which the Co content may be reduced as low as possible and magnetic properties applicable to security ink may be obtained.

DISCLOSURE

Technical Problem

Accordingly, the present disclosure has been made keeping in mind the above problems occurring in the prior art, and an objective of the present disclosure is to provide an AlNiCo-based hard magnetic particle having a low Co content while having magnetic properties applicable to security ink, and a method of manufacturing the same.

More particularly, provided are an AlNiCo-based hard magnetic particle, wherein a residual magnetization/coercive force ratio thereof is 0.06 or more and the Co content is, by weight, 17% or less in the range of coercive force from 250 Oe to 450 Oe, and a method of manufacturing the same.

The objectives of the present disclosure are not limited to the aforementioned description, and other objectives and advantages of the present disclosure not explicitly described will be clearly understood from the description provided hereinafter.

Technical Solution

In order to accomplish the above objective, an embodiment of the present disclosure provides an AlNiCo-based hard magnetic particle including Al, Ni, Co, Cu, and Ti, with the balance being Fe. The Co content may range from 10% to 17% by weight. Coercive force may range from 250 Oe to 450 Oe. A residual magnetization/coercive force ratio may be 0.06 or more.

The Ni content may range from 18% to 25% by weight. The Al content may range from 4% to 9% by weight, the Cu content may range from 1% to 4% by weight, and the Ti content may range from 2% to 5.5% by weight.

In addition, a sum of the Co content and the Ni content may range from 32% to 40% by weight.

In the AlNiCo-based hard magnetic particle according to an embodiment of the present disclosure, an intermediate layer made from $ZrO_2$ or $TiO_2$ and a metal coating layer made from Ag may be sequentially formed on the surface of the AlNiCo-based hard magnetic particle.

Security ink according to an embodiment of the present disclosure may include any one of the above-described AlNiCo-based hard magnetic particles.

An embodiment of the present disclosure provides a method of manufacturing AlNiCo-based hard magnetic particles respectively including Al, Ni, Co, Cu, and Ti, with the balance being Fe. The method may include: producing a molten metal by melting an AlNiCo alloy raw material; producing minute particles from the molten metal by atomization; selecting particles respectively having a predetermined size or smaller from among the produced minute particles by air current classification; and heat-treating the selected particles in an inert gas atmosphere. The AlNiCo alloy raw material may include, by weight, 4% to 9% of Al, 18% to 25% of Ni, 10% to 17% of Co, 1% to 4% of Cu, and 2% to 5.5% of Ti, with the balance being Fe.

The method may further include: forming an intermediate layer made from $ZrO_2$ or $TiO_2$; and forming a metal coating layer made from Ag. Here, the coating layer may be formed by electroless plating using ethylenediamine as a complexing agent.

Advantageous Effects

According to the present disclosure, the AlNiCo-based hard magnetic particle having a low Co content while having magnetic properties applicable to security ink and the method of manufacturing the same may be provided.

More particularly, the AlNiCo-based hard magnetic particle, wherein residual magnetization/coercive force ratio thereof is 0.06 or more and the Co content is, by weight, 17% or less in the range of coercive force from 250 Oe to 450 Oe, and the method of manufacturing the same may be provided.

However, the effects of the present disclosure are not limited to the aforementioned description, and other effects of the present disclosure not explicitly described will be clearly understood from the description provided hereinafter by those skilled in the technical field to which the present disclosure pertains.

DESCRIPTION OF DRAWINGS

FIG. 2 is a flowchart illustrating a method of forming a silver (Ag) coating layer according to embodiments of the present disclosure.

MODE FOR INVENTION

Figure 1:
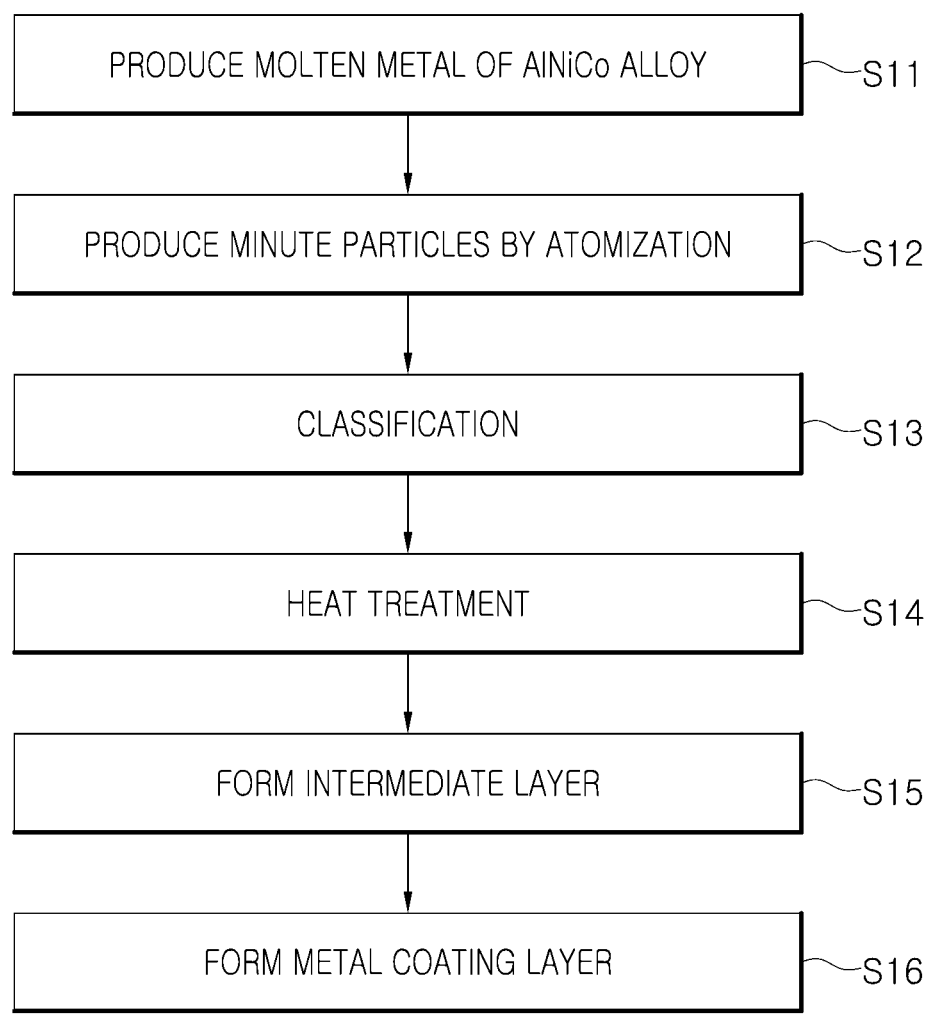
FIG. 1 illustrates a method of manufacturing AlNiCo hard magnetic particles according to embodiments of the present disclosure.

Hereinafter, exemplary embodiments of the present disclosure will be described in detail while not being limited or restricted thereby. In the following description of the present disclosure, a detailed description of related known technology will be omitted in the situation in which the subject matter of the present disclosure may be rendered rather unclear thereby. In addition, unless otherwise defined, all terms used herein should be construed as having the same meaning as commonly understood by those skilled in the technical field to which the present disclosure pertains.

The present disclosure relates to an AlNiCo-based hard magnetic particle. In particular, the present disclosure relates to an AlNiCo-based hard magnetic particle having a low Co content, with magnetic properties thereof being suitable to be detected by a magnetoresistive device. Here, the suitable magnetic properties may be defined as a suitable range of coercive force and a residual magnetization/coercive force ratio in the range of coercive force.

In embodiments of the present disclosure, the suitable range of coercive force may be from 250 Oe to 450 Oe. When the coercive force of the magnetic particle is greater than 450 Oe, it may be difficult to magnetize the magnetic particle contained in security ink using a permanent magnet of a typical magnetoresistive device. This may mean that the magnetic particle contained in the security ink may not be detected by the magnetoresistive device. In addition, when the coercive force is smaller than 250 Oe, the magnetic particle contained in the security ink may be magnetized without any problem, the detection limit of the magnetoresistive device may be exceeded since the residual magnetization of the magnetic particle is too low. That is, when the residual magnetization is excessively low, it may be difficult to detect the magnetic particle using the magnetoresistive device, due to the low intensity of a magnetic field generated by the magnetic particle. In particular, in some types of magnetoresistive devices without a built-in permanent magnet, a separately-provided permanent magnet must magnetize the magnetic particle before the magnetoresistive device detects a magnetic field from the magnetic particle by scanning a secure document. However, when the coercive force is smaller than 250 Oe, the magnetic particle has the properties of a soft magnetic material, in which the residual magnetization thereof rapidly disappears. Thus, at a point in time at which the magnetoresistive device scans the magnetic particle, the residual magnetization may already have disappeared.

According to embodiments of the present disclosure, the residual magnetization/coercive force ratio may be 0.06 or more. In particular, the residual magnetization/coercive force ratio must be realized in the range of coercive force from 250 Oe to 450 Oe. When the composition of the magnetic particle is adjusted to significantly increase the coercive force (e.g., the Co content is increased to be 20% or higher), the residual magnetization is also increased. Thus, it is relatively easy to set the residual magnetization/coercive force ratio to be 0.06 or more. However, in order to set the residual magnetization/coercive force ratio to be 0.06 or more while maintaining the coercive force in the range from 250 Oe to 450 Oe, a new composition range and a new manufacturing process must be designed.

The AlNiCo-based hard magnetic particle according to embodiments of the present disclosure may include Al, Ni, and Co, as well as Cu, Ti, Fe, and unavoidable impurities. Here, the Co content is characterized by ranging from 10% to 17% by weight.

When the Co content is higher than 17% by weight, it is easy to adjust a composition range satisfying intended magnetic properties. However, this is not economically competitive, since the content of expensive Co is increased. In addition, when the Co content is lower than 10% by weight, it is not easy to find a composition range in which the magnetization/coercive force ratio is 0.06 or more. Accordingly, in order to realize the objective of the present disclosure, the Co content according to embodiments of the present disclosure is adjusted in the range from 10% to 17% by weight.

According to embodiments of the present disclosure, it is possible to obtain magnetic properties intended in the present disclosure by setting the Co content to be 17% by weight or lower while concurrently adjusting the contents of the remaining components. In particular, a decrease in the numerical value of either the coercive force or the residual magnetization due to a reduction in the Co content may be compensated for by adjusting the Ni content to be in the range from 18% to 25% by weight. Specifically, a sum of the Co content and the Ni content may range from 28% to 42% by weight, more particularly, from 32% to 40% by weight.

In addition, the Al content may be adjusted in the range from 4% to 9% by weight. When the Al content meets this composition range, an anti-sintering effect may be obtained in subsequent heat treatment for controlling the magnetic properties. Consequently, when minute particles are manufactured by atomization, the shape of the minute particles may be maintained at a size applicable to security ink.

Cu and Ti may be added to an AlNiCo alloy to increase the coercive force and inhibit the reduction of the residual magnetization. Here, in order to obtain magnetic properties intended in the present disclosure, the Cu content may be adjusted to be in the range from 1% to 4% by weight, and the Ti content may be adjusted to be in the range from 2% to 5.5% by weight.

The AlNiCo hard magnetic particle according to embodiments of the present disclosure meets the above-described composition range of Al, Ni, Co, Cu, and Ti, wherein the balance may be Fe and unavoidable impurities.

The AlNiCo hard magnetic particles according to embodiments of the present disclosure may be contained in security ink. Here, the AlNiCo hard magnetic particles may be manufactured as light-color magnetic particles by forming a metal coating layer on the surface thereof in order to impart a variety of colors to the security ink. The metal coating layer may reflect incident light, thereby causing the AlNiCo-based hard magnetic particle to look brighter. The metal coating layer may be a silver (Ag) coating layer having superior reflectivity. The metal coating layer may be provided at a thickness of from about 50 nm to about 100 nm. When the metal coating layer is the Ag coating layer, the Ag content may be adjusted to be in the range from 10% to 20% by weight with respect to the weight of the AlNiCo particle so that the coating layer is uniformly formed.

Here, an intermediate layer may be formed before the formation of the metal coating layer so that the metal coating layer is uniformly formed. The intermediate layer may be made from a metal oxide, such as $TiO_2$ or $ZrO_2$. The intermediate layer may be formed at a thickness of from about 5 nm to about 15 nm.

Hereinafter, a method of manufacturing AlNiCo hard magnetic particles will be described with reference to FIG. 1.

First, a molten metal is produced by melting an AlNiCo alloy raw material having the above-described composition range in an inert gas atmosphere in S11. The AlNiCo alloy raw material may be melted after being mixed in the form of powder or may be melted after being produced as an ingot or scrap. The melting temperature may be about 1600° C.

Afterwards, minute particles are produced by atomization in S12. Specifically, the minute particles may be produced by injecting the molten metal into a vacuum atomization confinement and sprayed through a spray nozzle at a predetermined pressure while using water as a cooling medium to produce ultrafine particles at an excellent yield. Here, the water may contain an antioxidant such as urea. The spraying pressure may be about 600 bars.

From among the produced minute particles, particles having a predetermined size or smaller may be selected by a classification operation in S13. The classification operation may be implemented as air current classification. Particles having a particle size $D_{90}$ of 15 μm or smaller may be obtained by the classification operation. Here, $D_{90}$ indicates a particle size corresponding to 90% of the cumulative distribution of particle size.

The magnetic properties of the AlNiCo particles classified to have a predetermined size or smaller may adjusted by heat-treating the AlNiCo particles in an inert gas atmosphere in step S14. A hard magnetic material may be made by the heat treatment. Here, the magnetic properties of the AlNiCo hard magnetic particles may vary according to heat treatment conditions. In the present disclosure, the heat treatment may be performed at 750° C. in an argon (Ar) gas atmosphere for 1 hour.

The sequences of the step S13 and the step S14 may be changed. That is, the minute particles produced through the spraying may be heat-treated before the classification operation is performed.

The AlNiCo hard magnetic particles manufactured in this manner may have a residual magnetization/coercive force ratio of 0.06 or more in the range of coercive force from 250 Oe to 450 Oe while having a Co content of 17% or lower.

Step S15 and step S16 may be selectively performed in order to impart a light color to the AlNiCo hard magnetic particles so that the AlNiCo hard magnetic particles may be applied to a variety of designs of security ink. The step S15 is a step of forming an intermediate layer, which may be made from a metal oxide, such as $TiO_2$ or $ZrO_2$. The intermediate layer may be formed at a thickness of from about 5 nm to about 15 nm. The intermediate layer may be formed by a sol-gel coating method, but a forming method thereof is not specifically limited. The step S16 is a step of forming a metal coating layer, which may be an Ag coating layer having superior reflectivity. The metal coating layer may be formed at a thickness of from about 50 nm to about 100 nm.

In the step S16, the metal coating layer may be formed by an electroless plating method. For example, the Ag coating layer may be formed according to the sequences illustrated in FIG. 2. Referring to FIG. 2, a method of forming an Ag coating layer according to embodiments of the present disclosure may include: step S21 of preparing a silver-amine complex solution; step S22 of inputting AlNiCo hard magnetic particles into the prepared silver-amine complex solution; step S23 of inputting a reducing agent solution; and a washing and drying step S24.

First, the step S21 may be a step of preparing the silver-amine complex solution by inputting an Ag precursor, a pH adjuster, and a complexing agent into a solvent and stirring the resultant mixture. Here, the solvent may be distilled water, the Ag precursor may be silver nitrate ($AgNO_3$), and the complexing agent may be ammonia ($NH_3$) or ethylenediamine. Ammonia may be input in the form of ammonium hydroxide ($NH_4OH$) or ammonium salt. Particularly, ethylenediamine may be used to uniformly form the Ag coating layer. The stirring may be performed until a brown precipitate is formed.

The step S22 is a step of inputting AlNiCo hard magnetic particles into the prepared silver-amine complex solution. The AlNiCo hard magnetic particles may be particles respectively having the intermediate layer formed on the surfaces thereof. After the AlNiCo hard magnetic particles are input, a stirring step may be performed to help the hard magnetic particles be better mixed with the silver-amine complex solution.

Subsequently, the reducing agent solution is input in the step S23. The reducing agent solution may include glucose, fructose, galactose, potassium tartrate, potassium sodium tartrate, sodium tartrate, stearyl tartrate, formaldehyde, and the like. Particularly, a solution formed by dissolving glucose and potassium sodium tartrate in distilled water may be used.

Finally, in the step S24, the AlNiCo hard magnetic particles having the silver coating layer may be separated, followed by washing and drying. The AlNiCo hard magnetic particles may be separated using a magnet, and the washing may be performed using ethanol several times.

The present disclosure provides security ink containing AlNiCo hard magnetic particles as an embodiment. The security ink according to the present disclosure may include, by weight, 5% to 15% of AlNiCo hard magnetic particles as described above, 20% to 40% of varnish, 30% to 50% of pigment, 5% to 10% of surfactant, 1% to 10% of wax, and 2% to 10% of solvent.

For example, the varnish may be a thermoplastic resin, a thermosetting resin, or a photocuring resin, or may be one substance soluble in an organic solvent. The thermoplastic resin may include petroleum resin, casein, shellac, rosin-modified maleic acid resin, rosin-modified phenolic resin, nitrocellulose, cellulose acetate butyrate, cyclized rubber, chlorinated rubber, oxidized rubber, hydrochloric acid rubber, phenolic resin, alkyd resin, polyester resin, unsaturated polyester resin, amino resin, epoxy resin, vinyl resin, vinyl chloride resin, vinylidene chloride resin, chloride Vinyl acetate resin, ethylene vinyl acetate resin, acrylic resin, methacrylic resin, polyurethane resin, silicone resin, fluorine resin, drying oil, synthetic drying oil, styrene-maleic acid resin, styrene-acrylic resin, polyamide resin, butyral resin, and the like. The thermosetting resin may include epoxy resin, phenol resin, benzoguanamine resin, melamine resin, urea resin, and the like. The photocuring resin (or photosensitive resin) may be a resin prepared by introducing a photo-crosslinkable group, such as a (meth)acrylyl group, or styryl group, into a linear polymer having a reactive substituent, such as a hydroxy group, a carboxyl group, or an amino group, by reacting the linear polymer with a (meth)acrylic compound having a reactive substituent, such as an isocyanate group, an aldehyde group, or an epoxy group, or cinnamic acid. In addition, a product prepared by half-esterifying a linear polymer containing an anhydride, such as a styrene-maleic anhydride copolymer or an α-olefin-maleic anhydride copolymer, with a (meth)acrylic compound having a hydroxy group, such as a hydroxyalkyl (meth)acrylate, may be used.

The pigment may be implemented as, but not specifically limited to, for example, soluble azo pigment, insoluble azo pigment, phthalocyanine pigment, halogenated phthalocyanine pigment, quinacridone pigment, isoindolinone pigment, isoindoline pigment, perylene pigment, perinone pigment, dioxazine pigment, anthraquinone pigment, dianthraquinonyl pigment, anthrapyrimidine pigment, andanthrone pigment, indanthrone pigment, flavanthrone pigment, pyranthrone pigment, diketopyrrolopyrrole pigment, or the like.

The surfactant may be one or more selected from the group consisting of fluorinated surfactant, polymerizable fluorinated surfactant, siloxane surfactant, polymerizable siloxane surfactant, polyoxyethylene surfactant, derivatives thereof, and the like. The type of the surfactant is not specifically limited.

The wax may be a powder type wax able to reduce the tack of the resin. For example, the wax may include one or more selected, but not limited to, from among polyethylene wax, amide wax, erucamide wax, polypropylene wax, paraffin wax, Teflon, carnauba wax, and the like.

The solvent is not specifically limited as long as the solvent is a general organic solvent that may uniformly mix substances, such as wax, pigment, and varnish. Available solvents may be one or more selected from among ethyl acetate, n-butyl acetate, isobutyl acetate, toluene, xylene, acetone, hexane, methyl ethyl ketone, cyclohexanone, propylene glycol monomethyl ether acetate, diethylene glycol monoethyl ether acetate, diethylene glycol diethyl ether, diethylene glycol monobutyl ether, dipropylene glycol monomethyl ether acetate, diethylene glycol monoethyl acetate, diethylene glycol monobutyl ether acetate, and the like.

The security ink according to embodiments of the present disclosure may have a viscosity of 12 Pa·sec or less, and particularly, a viscosity ranging from 8 Pa·sec to 12 Pa·sec.

Hereinafter, the present disclosure will be described in more detail with reference to specific Examples.

1. Manufacture of AlNiCo Hard Magnetic Particles

After raw material powder having a designed composition was put into a furnace, the furnace was heated to 1,600° C. to produce a molten AlNiCo-based metal. The raw material powder was implemented as powder having a purity of 99.9% or higher. The molten metal was introduced into a vacuum atomization confinement and was sprayed at 600 bars while using a 25% urea-water solution (UWS) as a cooling medium to produce minute particles.

The produced minute particles are heat-treated at 750° C. in an Ar gas atmosphere for 1 hour. Particles produced after the heat treatment are classified by a cyclone method using an air current, in conditions in which the revolution speed was 7500 rpm and the air injection rate was 2.8 m$^3$/min. Particles having a particle size $D_{90}$ of 15 μm or smaller are produced by the air current classification. The produced particles are washed with ethanol two times and dried at 60° C.

Whether or not the particles are manufactured according to the designed composition was determined by performing elemental analysis (10 kV, 100 sec) on the central areas of the produced particles using Magellan 400, i.e., an energy dispersive X-ray spectroscope (EDS) available from FEI company.

A variety of samples according to Examples and Comparative Examples are prepared by varying the designed composition. All of the samples are manufactured by the same method, except for the compositions thereof. The compositions of AlNiCo hard magnetic particles according to Examples and Comparative Examples are illustrated in Table 1.

TABLE 1

| Classification | Al (wt %) | Ni (wt %) | Co (wt %) | Cu (wt %) | Ti (wt %) | Ni + Co (wt %) |
|---|---|---|---|---|---|---|
| Example 1 | 6 | 20 | 14 | 3 | 4.5 | 34 |
| Example 2 | 6.5 | 18.5 | 14 | 2 | 5 | 32.5 |
| Example 3 | 4.5 | 24 | 13 | 3.5 | 4.3 | 37 |
| Example 4 | 8 | 23 | 16 | 3 | 4 | 39 |
| Comp. Ex. 1 | 11.6 | 28.4 | 2.1 | 4.1 | 1.8 | 30.5 |
| Comp. Ex. 2 | 6.6 | 17 | 24 | 2.5 | 4.1 | 41 |
| Comp. Ex. 3 | 6 | 14 | 24 | 3 | — | 38 |

2. Measurement of Magnetic Properties

The coercive force (Hc) and the residual magnetization (Mr) of the manufactured magnetic particles are measured using a Lakeshore 7400 series vibrating sample magnetometer (VSM). Measurement results are illustrated in Table 2.

TABLE 2

| Classification | Mr (Am$^2$/kg) | Hc (Oe) | Mr/Hc |
|---|---|---|---|
| Example 1 | 27.5 | 413 | 0.067 |
| Example 2 | 27.4 | 421 | 0.065 |
| Example 3 | 26.7 | 403 | 0.066 |
| Example 4 | 25.4 | 394 | 0.064 |
| Comp. Ex. 1 | 22 | 399 | 0.055 |

TABLE 2-continued

| Classification | Mr (Am²/kg) | Hc (Oe) | Mr/Hc |
| --- | --- | --- | --- |
| Comp. Ex. 2 | 29 | 502 | 0.058 |
| Comp. Ex. 3 | 10 | 125 | 0.080 |

From the results of Tables 1 and 2, it was found that each of the AlNiCo hard magnetic particles according to Examples 1 to 4 of the present disclosure had coercive force in the range from 250 Oe to 450 Oe and a residual magnetization/coercive force ratio of 0.06 or more. In particular, these magnetic properties are obtained at a low Co content of 17% by weight or lower. In addition, it was found that, in all of the example samples, the Ni content was in the range from 18% to 25% by weight, and the sum of the Ni and Co contents was in the range from 28% to 42% by weight, more particularly, from 32% to 40% by weight.

In addition, the Al content was in the range from 4% to 9% by weight, the Cu content was in the range, from 1% to 4% by weight and the Ti content was in the range from 2% to 5.5% by weight.

In contrast, in Comparative Examples out of these composition ranges, the intended magnetic properties were not obtained. In Comparative Example 1, the range of coercive force is met, but the magnetization/coercive force ratio was 0.055 smaller than 0.06, due to the low residual magnetization. In Comparative Example 2, the residual magnetization was large, but the coercive force was also significantly increased, thereby causing the residual magnetization/coercive force ratio to be 0.058 smaller than 0.06. In addition, in Comparative Example 3, the residual magnetization/coercive force ratio was a large value of 0.08, but the coercive force and the residual magnetization had such low absolute values that it was difficult to detect the coercive force and the residual magnetization using the magnetoresistive device. In particular, both Comparative Example 2 and Comparative Example 3 have a high Co content of 24% and are not desirable in terms of economic competitiveness.

Although the present disclosure has been described hereinabove with reference to the specific embodiments and the drawings, the description is for illustrative. Those skilled in the art will appreciated that various modifications are possible without departing from the scope of the technical idea of the present disclosure. In addition, the technical ideas described in the respective embodiments may be carried out not only independently but also in combinations. Therefore, the scope of protection of the present disclosure shall be defined by the language of the Claims and the equivalents thereof.

The invention claimed is:

1. A magnetic particle comprising:
    an AlNiCo-based hard magnetic particle disposed at an inside of the magnetic particle and comprising Al, Ni, Co, Cu, and Ti, with a remainder of the AlNiCo-based hard magnetic particle being Fe,
    wherein the AlNiCo-based hard magnetic particle has a Co content between 10% by weight to 17% by weight, a Ni content is between 18% by weight and 25% by weight, an Al content is between 4% by weight and 9% by weight, a Cu content is between 1% by weight and 4% by weight, and a Ti content is between 2% by weight and 5.5% by weight and has a coercive force between 250 Oe and 450 Oe and a residual magnetization/coercive force ratio of 0.06 or more, and
    wherein a sum of a Co content and a Ni content is a value between 32% by weight and 40% by weight.

2. The magnetic particle according to claim 1, further comprising:
    an intermediate layer made from at least one of $ZrO_2$ and $TiO_2$ and formed on a surface of the AlNiCo-based hard magnetic particle; and
    a metal coating layer made from Ag sequentially formed on a surface of the intermediate layer.

3. Security ink comprising a light-color magnetic particle comprising:
    an AlNiCo-based hard magnetic particle disposed at an inside of the magnetic particle and comprising:
        Al, Ni, Co, Cu, and Ti, with a remainder of the AlNiCo-based hard magnetic particle being Fe,
        wherein the AlNiCo-based hard magnetic particle has a Co content between 10% by weight to 17% by weight, a Ni content is between 18% by weight and 25% by weight, an Al content is between 4% by weight and 9% by weight, a Cu content is between 1% by weight and 4% by weight, and a Ti content is between 2% by weight and 5.5% by weight, and has a coercive force between 250 Oe and 450 Oe and a residual magnetization/coercive force ratio of 0.06 or more, and
    wherein a sum of a Co content and a Ni content is a value between 32% by weight and 40% by weight.

4. The security ink of claim 3,
    wherein the magnetic particle further includes:
    an intermediate layer made from at least one of $ZrO_2$ and $TiO_2$ and formed on a surface of the AlNiCo-based hard magnetic particle; and
    a metal coating layer made from Ag sequentially formed on a surface of the intermediate layer.

5. A method of manufacturing magnetic particles including AlNiCo-based hard magnetic particles, wherein each of the AlNiCo-based hard magnetic particles is disposed at an inside of a corresponding magnetic particle of the magnetic particles and comprises Al, Ni, Co, Cu, and Ti, with a remainder of each of the AlNiCo-based hard magnetic particles being Fe, the method comprising:
    producing a molten metal by melting an AlNiCo alloy raw material;
    producing minute particles from the molten metal by atomizing the molten metal;
    selecting particles having a predetermined size or smaller from among the produced minute particles through air current classification; and
    heat-treating the selected particles in an inert gas atmosphere to form the AlNiCo-based hard magnetic particles,
    wherein the AlNiCo alloy raw material comprises, by weight, from 4% to 9% of Al, from 18% to 25% of Ni, from 10% to 17% of Co, from 1% to 4% of Cu, and from 2% to 5.5% of Ti, and
    wherein a sum of the Co and Ni in the AlNiCo alloy raw material is, by weight, from 32% to 40%.

6. The method according to claim 5, further comprising:
    forming an intermediate layer made from at least one of $ZrO_2$ and $TiO_2$ on a surface of each of the AlNiCo-based hard magnetic particles; and
    forming a metal coating layer made from Ag on a surface of the intermediate layer to form a magnetic particle.

7. The method according to claim 6,
    wherein the metal coating layer is formed by electroless plating using ethylenediamine as a complexing agent.

* * * * *